US011126556B1

(12) United States Patent
Mukherjee

(10) Patent No.: US 11,126,556 B1
(45) Date of Patent: Sep. 21, 2021

(54) HISTORY TABLE MANAGEMENT FOR A CORRELATED PREFETCHER

(71) Applicant: Marvell Asia Pte, Ltd., Singapore (SG)

(72) Inventor: Shubhendu Sekhar Mukherjee, Southborough, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 16 days.

(21) Appl. No.: 16/863,284

(22) Filed: Apr. 30, 2020

Related U.S. Application Data

(60) Provisional application No. 62/876,460, filed on Jul. 19, 2019.

(51) Int. Cl.
*G06F 12/0862* (2016.01)

(52) U.S. Cl.
CPC .. *G06F 12/0862* (2013.01); *G06F 2212/6024* (2013.01)

(58) Field of Classification Search
CPC .................................................. G06F 12/0862
USPC ............................................................. 711/137
See application file for complete search history.

(56) References Cited

U.S. PATENT DOCUMENTS

| | | | |
|---|---|---|---|
| 5,889,893 A * | 3/1999 | Robson | G06T 3/60 382/296 |
| 7,487,296 B1 | 2/2009 | Iacobovici et al. | |
| 9,098,418 B2 | 8/2015 | Kannan et al. | |
| 10,013,357 B2 | 7/2018 | Mukherjee et al. | |
| 2009/0198983 A1* | 8/2009 | Levitan | G06F 9/3848 712/240 |

OTHER PUBLICATIONS

Nesbit et al., "Data Cache Prefetching Using a Global History Buffer", HPCA '04 Proceedings of the 10th International Symposium on High Performance Computer Architecture, p. 96.
Michaud, "A Best-Offset Prefetcher", 2nd Data Prefetching Championship, Jun. 2015, Portland, France. 2015. <hal-01165600>.
Jain, A. and Lin, C., "Linearizing irregular memory accesses for improved correlated prefetching", MICRO 46: Proceedings of the 46th Annual IEEE/ACM International Symposium on Microarchitecture (p. 247-259), Dec. 2013.

* cited by examiner

*Primary Examiner* — Jae U Yu
(74) *Attorney, Agent, or Firm* — Young Basile Hanlon & MacFarlane, P.C.

(57) ABSTRACT

Memory prefetching in a processor comprises: identifying, in response to memory access instructions, a pattern of addresses; and determining, based on the pattern of addresses, an address to prefetch. Determining the address to prefetch comprises: determining, using the pattern of addresses, an index into a history table; retrieving, from the history table and using the index, an offset value, wherein the offset value is not the address to prefetch; and determining the address to prefetch using the offset value and at least one address of the pattern of addresses. The method further comprises prefetching the address to prefetch.

20 Claims, 8 Drawing Sheets

HISTORY TABLE MANAGEMENT FOR A CORRELATED PREFETCHER

CROSS-REFERENCE TO RELATED APPLICATION(S)

This application claims priority to and the benefit of U.S. Provisional Application Patent Ser. No. 62/876,460, filed Jul. 19, 2019, the entire disclosure of which is hereby incorporated by reference.

TECHNICAL FIELD

This disclosure relates to processors and more specifically to history table management for a correlated prefetcher.

BACKGROUND

In a demand-fetch model, the content (e.g., a datum) of a memory location are fetched in response to an instruction request (e.g., a memory load instruction). If the requested datum is not in a cache, the datum is fetched from main memory. As memory access latency is relatively long (e.g., in terms of processor cycles), the processor may stall (e.g., sit idly) until the datum is fetched.

Prefetching can be employed as a latency tolerance technique. Generally, a prefetch request is a type of memory request that attempts to predict a future memory request based on a predicted or learned access pattern (i.e., a pattern of addresses). That is, memory content (e.g., program instructions or data) is fetched and loaded into a memory system (e.g., a cache) before it is needed. The prefetch request can be used to preload a memory level (e.g., a cache level in a hierarchical memory system, or other storage location, which has a relatively faster access time than another memory level, such as main memory) so that the expected future memory request will hit in that cache level instead of having to access a higher cache level or a main memory. Thus, prefetching attempts to mitigate (e.g., eliminate or, at least, reduce) the memory access latency and/or cache misses thereby increasing the processor throughput.

At a high level, a prefetcher works as follows: the prefetcher detects a pattern of memory accesses, which was previously learned; when the prefetcher detects that a part of the pattern is being accessed, then the prefetcher prefetches a next address that is part of the pattern. To restate, a prefetcher observes memory accesses (e.g., loads and stores) and prefetches data based on past access behavior.

SUMMARY

A data structure (or circuitry) is typically used to store learned patterns of addresses and the corresponding addresses to prefetch. For ease of reference, such a data structure is referred to herein as a history table. History tables tend to be limited in size. Described herein are techniques for storing more information in a history table (so that cache hits are increased) without increasing the size of the history table or, alternatively, minimizing the size of the history table.

In one aspect, in general, a method for memory prefetching in a processor comprises: identifying, in response to memory access instructions, a pattern of addresses; and determining, based on the pattern of addresses, an address to prefetch. Determining the address to prefetch comprises: determining, using the pattern of addresses, an index into a history table; retrieving, from the history table and using the index, an offset value, wherein the offset value is not the address to prefetch; and determining the address to prefetch using the offset value and at least one address of the pattern of addresses. The method further comprises prefetching the address to prefetch.

Aspects can include one or more of the following features.

The offset value is a difference between one address of the pattern of addresses and the address to prefetch.

The one address of the pattern of addresses is a last address of the pattern of addresses.

Determining, using the pattern of addresses, the index into the history table comprising: determining the index by XORing the addresses of the pattern of addresses.

Determining, using the pattern of addresses, the index into the history table comprising: determining the index by XORing the addresses of the pattern of addresses and at least one program counter associated with an address of the pattern of addresses.

In response to identifying the pattern of addresses, incrementing a counter associated with the pattern of addresses.

Only on a condition that the counter has reached a threshold value, performing the determining the address to prefetch and the prefetching the address to prefetch.

In response to detecting the memory access instructions of the pattern of addresses followed by an access to the address to prefetch: calculating the offset value; and in response to the offset value meeting a storage criterion, inserting an entry in the history table, wherein the entry comprising the index and the offset value.

The index is a first index for a first set of instructions and a second index for a second set of instructions, and the offset value is a first offset value when the index is the first index and a second value when the index is the second index.

In another aspect, in general, a method for memory prefetching in a processor comprises: identifying, in response to memory access instructions, a pattern of addresses; and determining, based on the pattern of addresses, an address to prefetch. Determining the address to prefetch comprises: determining, using the pattern of addresses, an index into a history table, by XORing the addresses of the pattern of addresses; and determining, by accessing the history table using the index, the address to prefetch. The method further comprises prefetching the address to prefetch.

Aspects can include one or more of the following features.

Determining, by accessing the history table using the index, the address to prefetch comprising: obtaining an offset value from the history table, wherein the offset value is not the address to prefetch; and determining the address to prefetch using the offset value and at least one address of the pattern of addresses.

The offset value is a difference between one address of the pattern of addresses and the address to prefetch.

The one address of the pattern of addresses is a last address of the pattern of addresses.

In response to detecting the memory access instructions of the pattern of addresses followed by an access to the address to prefetch, calculating the offset value; and in response to the offset value meeting a storage criterion, inserting an entry in the history table, wherein the entry comprising the index and the offset value.

Determining, using the pattern of addresses, the index into the history table, by XORing the addresses of the pattern of addresses comprising: determining, using the pattern of addresses, the index into the history table by further XORing a program counter associated with at least one address of the pattern of addresses.

In another aspect, in general, a computing system comprises: a lower-level cache; a next-higher-level cache; and a prefetcher, wherein the prefetcher is configured to: identify, in response to memory access instructions, a pattern of addresses; determine, based on the pattern of addresses, an address to prefetch, wherein to determine the address to prefetch comprises to: determine, using the pattern of addresses, an index into a history table; retrieve, from the history table and using the index, an offset value, wherein the offset value is not the address to prefetch; and determine the address to prefetch using the offset value and at least one address of the pattern of addresses; and prefetch the address to prefetch.

Aspects can include one or more of the following features.

The lower-level cache is an L1 cache and the next-higher-level cache is an L2 cache.

The offset value is a difference between one address of the pattern of addresses and the address to prefetch.

To determine, using the pattern of addresses, the index into the history table comprises to determine the index by XORing the addresses of the pattern of addresses.

To determine, using the pattern of addresses, the index into the history table comprises to determine the index by XORing the addresses of the pattern of addresses and at least one program counter associated with an address of the pattern of addresses.

These and other aspects of this disclosure are disclosed in the following detailed description of the implementations, the appended claims and the accompanying figures.

BRIEF DESCRIPTION OF THE DRAWINGS

The disclosure is best understood from the following detailed description when read in conjunction with the accompanying drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

DETAILED DESCRIPTION

Figure 1:
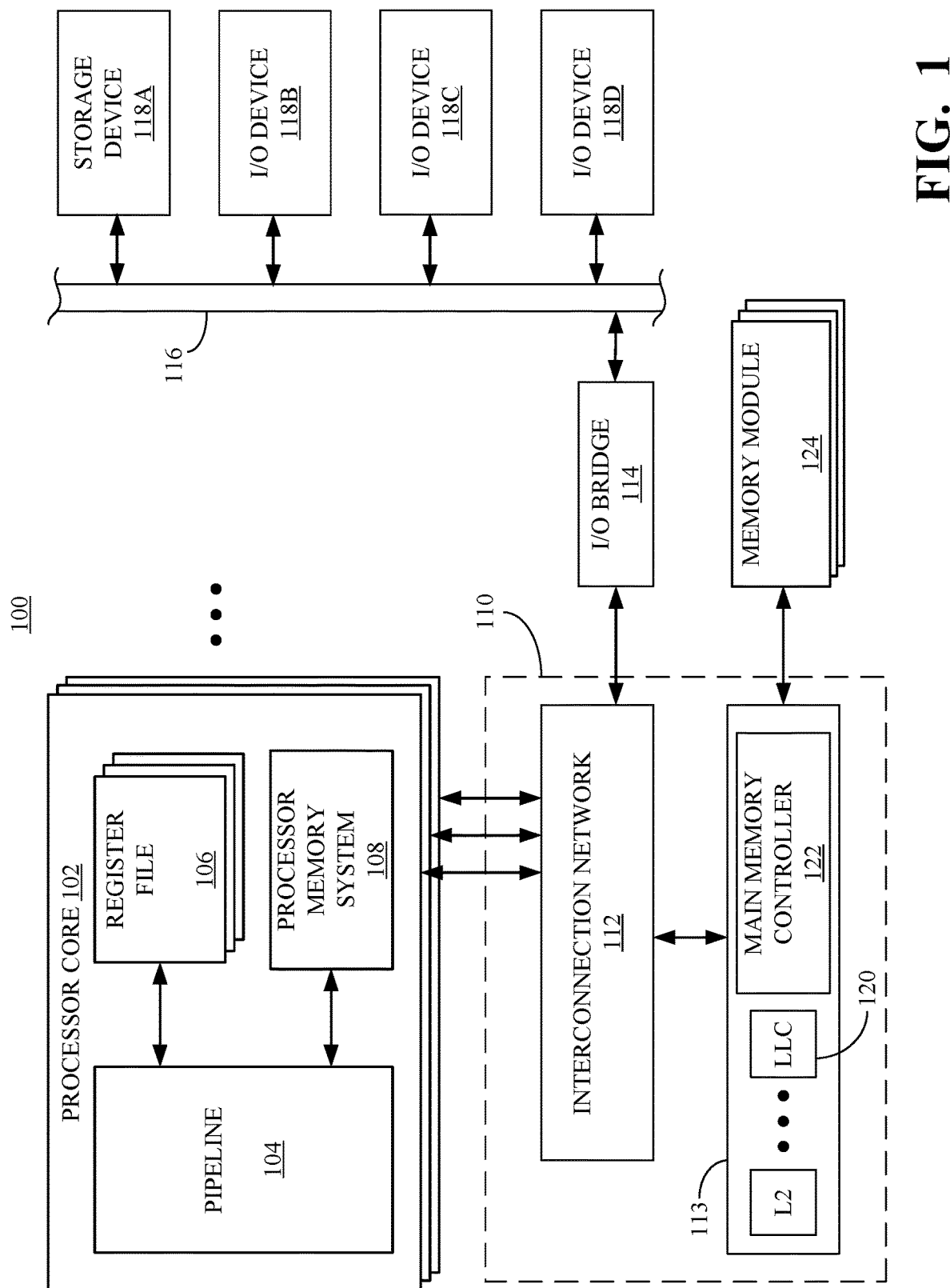
FIG. 1 is a high-level block diagram of an example of a computing system 100.
Figure 2:
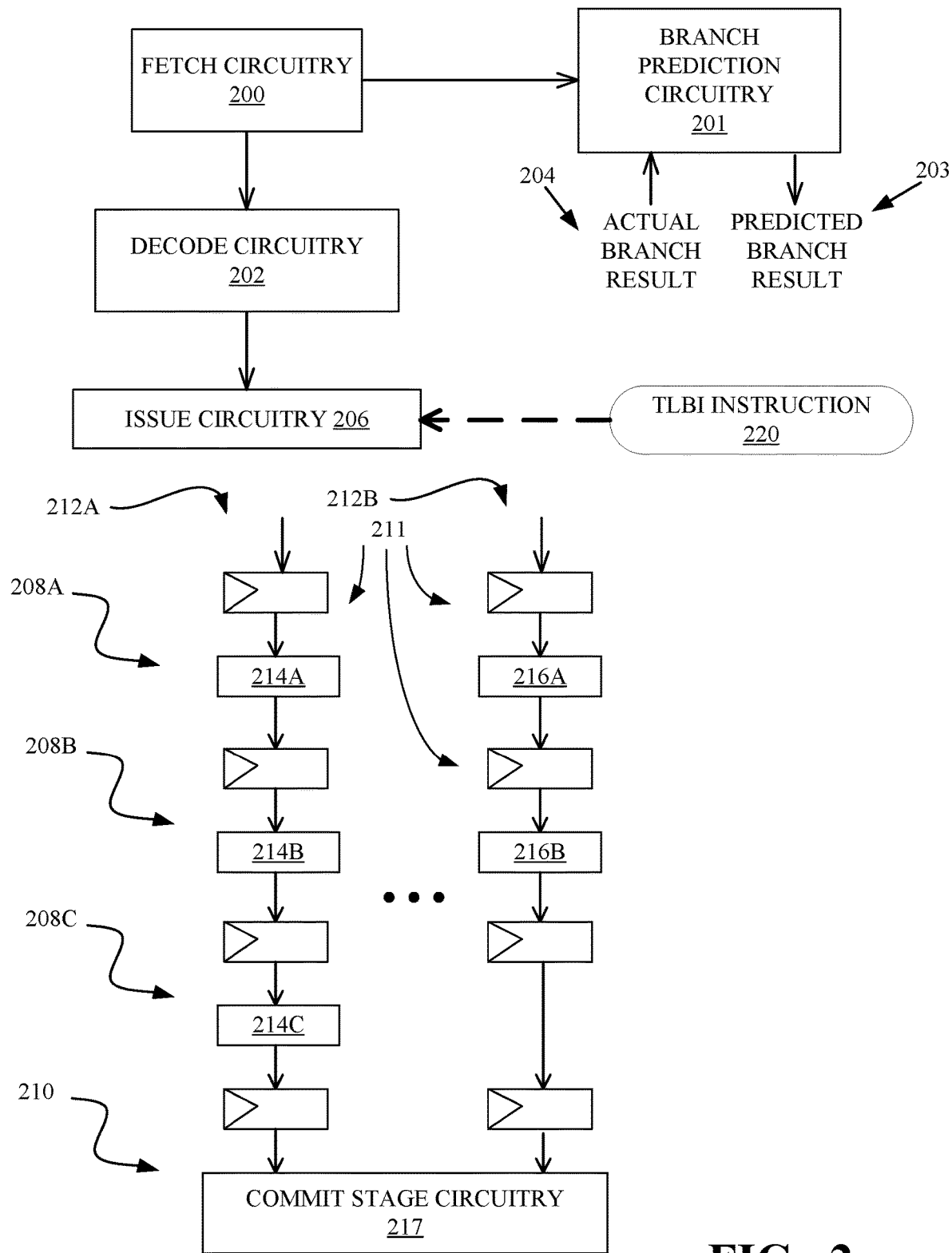
FIG. 2 is an example of a configuration of the pipeline of FIG. 1.
Figure 3:
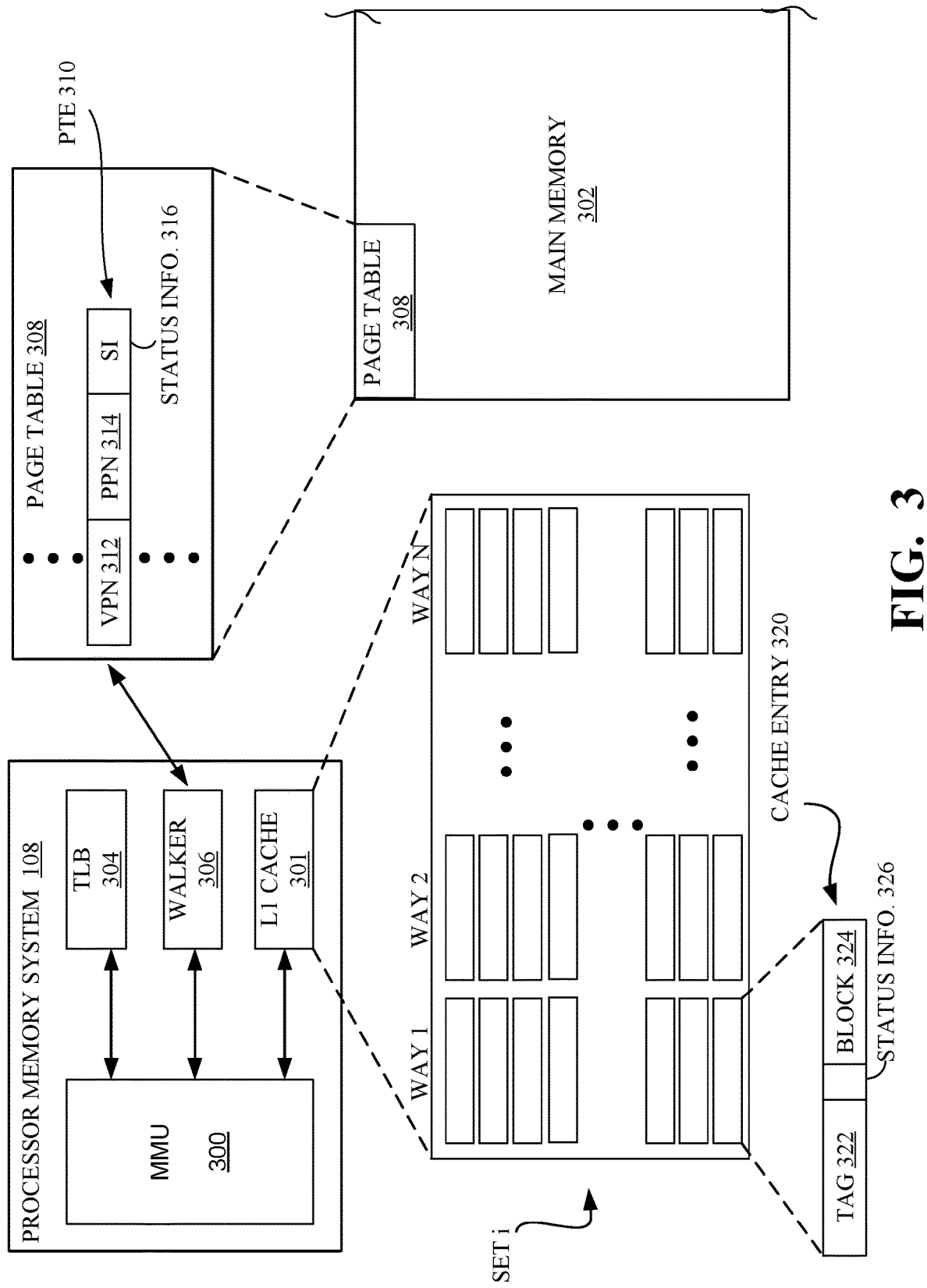
FIG. 3 is an example of a configuration of the processor memory system of FIG. 1.

Hardware data prefetchers are useful to out-of-order processor cores, such as those described with respect to FIGS. 1-3. As mentioned above, memory latencies continue to grow with each technology generation. This is because wires do not scale as effectively with each generation. Further, with each generation, a greater number of cores are added to a multicore complex, which makes Dynamic Random Access Memory (DRAM) further away, on average, from each core. Neither are DRAM latencies shrinking with each generation. An out-of-order core is effective in reducing the compute latencies. However, out-of-order execution can expose memory latency as one of the most critical components that must be optimized.

As mentioned above, prefetching can be used as a memory access latency mitigation technique. Prefetching can be performed using various modules that are implemented in hardware. For example, a prefetcher can be part of a computing system, such as the computing system 100 of FIG. 1.

One or more prefetching strategies (managed using one or more prefetchers) can be employed in a computing system. Examples of prefetchers include a stream (or strided) prefetcher, a next line prefetcher, or a correlated prefetcher. Other prefetching strategies are possible. At a high level, a prefetcher learns a pattern of memory address accesses and uses the pattern to perform prefetches. Prefetchers are used to prefetch data (i.e., program instructions or program data) from various cache levels as well as from DRAM.

The correlated prefetcher learns a pattern of addresses based on a correlation between accessed memory addresses. The pattern of addresses may be arbitrary and irregular. For example, in the series of a memory accesses A, B, C, A, B, C, A, C, F, F, F, A, A, B, and C (where A, B, C, and F are memory addresses), the sequence includes the patterns (A, B, C), (A, B), and (B, C). It is noted that the sequence includes other patterns. However, only the identified patterns are used herein for illustration purposes.

The correlated prefetcher may, depending on the strategy of the correlated prefetcher, learn that there is a 100% (i.e., 3 out of 3) chance that the sub-pattern (A, B) will be followed by an access to C; that there is a 100% (i.e., 3 out of 3) chance that the sub-pattern (B) will be followed by an access to C; that there is a 75% (i.e., 3 out of 4) chance that the sub-pattern (A) will be followed by an access to B and a 25% (i.e., 1 out of 4) that the sub-pattern (A) will be followed by (C); and so on. Thus, for example, upon detecting an access to the sub-pattern (A), the correlated prefetcher can issue one or more prefetch instructions. For example, the correlated prefetcher can prefetch B, which is the most likely next address to be accessed based on the pattern (A, B). For example, the correlated prefetcher can prefetch both B and C, based on the patterns (A, B) and (A, C). In the described example, a lookahead value of the correlated prefetcher is based on a total length of a detected pattern and a number of addresses in that pattern between an address that triggers pattern detection and a fetched address, as described in more detail below.

The correlated prefetcher can be used to prefetch data associated with complex data structures. In some examples, the complex data structures may be represented as graphs with edges and nodes. Examples of such complex data structures include linked lists, doubly linked lists, trees, and the like. Examples of such complex data structures are described below with respect to FIG. 4.

A common drawback associated with correlated prefetchers is the relatively large size of the history table. Programs typically reference many, many addresses. For prefetching to be effective, these many address accesses should to be tracked and correlated by the prefetcher in the history table. However, there are limits (due, for example, to cost and space) on the size of the history table. For example, a history table may optimally need to be multiple megabytes in size, which may be far too large to store on chip (e.g., as a hardware component of a computing system).

The techniques and computing systems described herein can, as compared to previous techniques for storing correlation information in a history table, increase the amount of correlation information that can be stored in the history table without significantly increasing the size of the history table. For example, instead of storing absolute addresses for addresses to be prefetched, the techniques and computing systems described herein can store offset values that are related to at least one of the addresses of a detected pattern of addresses. For example, instead of storing absolute patterns of addresses, the addresses of the pattern of addresses, which triggers prefetching, a function that munges the addresses of the pattern of addresses into a smaller number of bits than is required for absolute addresses can be used and the resulting value of the function can be used as an index into the history table.

Thus, prefetching according to the techniques and computing systems can result in more cache hits. Consequently, the performance of an out-of-order core can be improved by prefetching, for example, graph structured applications that would not otherwise fit into a cache using a traditional correlated prefetcher.

The techniques and systems described herein can help to improve the timing of prefetches. On-time prefetches can be useful for improving the performance of a processor, which can be an out-of-order processor and/or a processor core in a multi-core architecture.

Further details of techniques for history table management for a correlated prefetcher are described herein with initial reference to a system in which they can be implemented, as shown in FIGS. 1 through 3.

FIG. 1 is a high-level block diagram of an example of a computing system 100. The computing system 100 includes at least one processor core 102, which can be a single central processing unit (CPU) or one of multiple processor cores in a multi-core architecture. In a multi-core architecture each processor core (or simply "core") can include an individual CPU with associated circuitry. In this example of a multi-core architecture, each processor core 102 can include a pipeline 104, one or more register files 106, and a processor memory system 108. Each register file of the register files 106 can include one or more individually addressable registers.

Each processor core 102 can be connected to an uncore 110. The uncore 110 can include an interconnection network 112 and an external memory system 113. The interconnection network 112 can be a bus, a cross-bar switch, a mesh network, or some other interconnection network. The interconnection network 112 can enable communication between each processor core 102 and an external memory system 113 and/or an input/output (I/O) bridge 114.

The I/O bridge 114 can enable communication, such as over an I/O bus 116, with various different I/O devices including a storage device 118A and other I/O devices 118B-118D. Non-limiting examples of the other I/O devices 118B-118D can include a network interface, a display adapter, or user input devices such as a keyboard or a mouse.

The storage device 118A can be a disk drive or some other large capacity storage device. The storage device 118A can typically be a non-volatile storage device. In some examples, the storage device 118A, or a portion thereof, can be used in a virtual memory scheme. For example, a portion of the storage device 118A can serve as secondary storage (or a 'backing store') in a virtual memory scheme for the (typically volatile and/or capacity-limited) main memory. Examples of main memory include the processor memory system 108 or an external memory system, such as described below with respect to an external memory system 113.

The processor memory system 108 and the external memory system 113 together form a hierarchical memory system. The hierarchy can include any number of levels. The levels may be denoted or referred to as L1, L2, ..., LN. The L1 level is a lower level memory than the L2 memory system, which in turn is a lower level than the L3 memory system, and so on. Typically, each level of the hierarchical memory system can include memory (e.g., a memory system) that is slower to access than that of the immediately lower level and/or each level of the hierarchical memory system can include memory (e.g., a memory system) that is faster to access, more limited in capacity, and/or more expensive than that of a higher level. Each level of the hierarchical memory system can serve as a cache.

A first level (L1) cache can be within (e.g., a part of) the processor memory system 108. Any number of higher level (L2, L3, ...) caches can be within the external memory system 113. The highest (i.e., last) level cache within the external memory system 113 can be referred to as the last level cache (LLC). In an example, the LLC can be the L2 cache.

At each level, the cache can include a first module that provides an instruction cache for caching instructions and a second module that provides a data cache for caching data. The memory system of a level of the hierarchical memory system can load blocks of instructions or data into entries and evict (e.g., removes, over-writes, etc.) blocks of instructions or data from entries in units of cache blocks (also called cache lines). Cache lines are further described with respect to FIG. 3.

In addition to the L1 instruction cache and data cache, the processor memory system 108 can include a translation lookaside buffer (TLB) for caching recent translations, and various other circuitry for handling a miss in the L1 instruction or data caches or in the TLB. For example, that circuitry in the processor memory system 108 of a processor core 102 can include a write buffer for temporarily holding values to be written from a store instruction being executed within the pipeline 104. The TLB is further described with respect to FIG. 3.

As already mentioned, the highest level cache within the external memory system 113 is the LLC (such as an LLC 120). The LLC 120 can be accessed (e.g., searched, etc.) just before main memory. Of course, this is only an example. The exact division between which level caches are within the processor memory system 108 and which are in the external memory system 113 can be different in other examples. For example, the L1 cache and the L2 cache can both be internal to the processor core 102 (i.e., part of the processor memory system 108) and the L3 (and higher) caches can be external to the processor core 102.

In an example, each processor core 102 can have its own internal L1 cache, and the processor cores can share an L2 cache. The external memory system 113 can also include a main memory controller 122. The main memory controller 122 can be connected to any number of memory modules 124. Each of the memory modules 124 can serve as (e.g., can be) the main memory. In a non-limiting example, one or more of the memory modules 124 can be Dynamic Random Access Memory (DRAM) modules.

In a typical example, the content of a memory address is searched for in a level (e.g., L1) of the hierarchical memory system. If not found, then the next higher level (e.g., L2) is searched; and so on. Searching for a memory address amounts to answering the question: does this memory level of the hierarchical memory system include the content of the memory address? Or, alternatively, is the memory address cached in this memory of the hierarchical memory system?

That is, in a particular cache level of the hierarchy of the hierarchical memory system, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (i.e., read or write) the memory block from a higher level cache, or from the main memory (in the case of a miss in the LLC).

Each level of the memory system typically has a different nominal (e.g., expected, designed, etc.) latency. For example, the nominal L1 cache latency may be 4 processor cycles; the nominal L2 cache latency may be 11 processor cycles; the nominal L3 cache latency may be 39 processor cycles; and the nominal main memory access latency may be 107 processor cycles.

The pipeline 104 can include multiple stages through which instructions advance, a cycle at a time. The stages can include an instruction fetch (IF) stage or stages, an instruction decode (ID) stage or stages, an operand fetch (OF) stage or stages, an instruction execution (IE) stage or stages, and/or a write back (WB) stage or stages. The pipeline can include other stages, as further described with respect to FIG. 2. Some stages occur in a front-end portion of the pipeline. Some other stages occur in a back-end portion of the pipeline. The front-end portion can include pre-execution stages. The back-end portion of the pipeline can include execution and post-execution stages. The pipeline 104 is further described with respect to FIG. 2.

First, an instruction is fetched (e.g., in the IF stage or stages). An instruction can be fetched based on a program counter (PC). The PC is a pointer that can be used to identify instructions within memory (e.g., within a portion of the main memory, or within an instruction cache of the core 102). The PC can advance through addresses of a block of compiled instructions (called a "basic block"). The PC can be incremented by a particular number of bytes. The particular number of bytes for incrementing the PC can depend on how long (e.g., in bytes) each instruction is and on how many instructions are fetched at a time.

After being fetched, the instruction is then decoded (e.g., in the ID stage or stages) to determine an operation and one or more operands. Alternatively, in some pipelines, the IF and ID stages can overlap. If the instruction includes operands, the operands are fetched (e.g., in the OF stage or stages).

The instruction is then ready to be issued. Issuing an instruction starts progression of the instruction through stages in a back-end portion of the pipeline to execute the instruction. In an example, execution of the instruction can involve applying the operation of the instruction to the operand(s) to produce a result for an arithmetic logic unit (ALU) instruction. In an example, execution of the instruction can involve storing or loading to or from a memory address for a memory instruction. In an example, execution of the instruction can involve evaluating a condition of a conditional branch instruction to determine whether or not the branch should be taken.

After an instruction has completed execution, the instruction can be committed (i.e., retired) so that any effect of the instruction is made globally visible to software. Committing an instruction may involve storing a result in a register file (e.g., in the WB stage or stages), for example. In most implementations, even if any instructions were issued out-of-order, all instructions are generally committed in-order.

FIG. 2 is an example of a configuration of the pipeline 104 of FIG. 1.

The pipeline 104 can include circuitry for the various stages (e.g., the IF, ID, and OF stages). For one or more instruction fetch stages, an instruction fetch circuitry 200 provides a PC to an instruction cache in a processor memory system, such as the processor memory system 108 of FIG. 1, to fetch (e.g., retrieve, read, etc.) instructions to be fed (e.g., provided to, etc.) into the pipeline 104. For example, the PC can be a virtual address of the next instruction, in which case the PC can be incremented by the length of a virtual address in the case of sequential execution (i.e., without taking any branches). Virtual addresses are described with respect to FIG. 3.

The instruction fetch circuitry 200 can also provide the program counter, PC, to a branch prediction circuitry 201. The branch prediction circuitry 201 can be used to provide a predicted branch result 203 for branch instructions. The predicted branch result 203 enables the pipeline 104 to continue executing speculatively while an actual branch result 204 is being determined. The branch prediction circuitry 201 can also store branch history information that is updated based on receiving the actual branch result 204. In some implementations, some or all of the branch prediction circuitry 201 can be considered to be a part of the instruction fetch circuitry 200.

In an example of the out-of-order execution, for one or more instruction decode (ID) stages, instruction decode circuitry 202 can store information in an issue queue for instructions in an instruction window waiting to be issued. The issue queue (which can also be referred to as an instruction queue) is such that an instruction in the queue can leave the queue when the operands of the instruction become available. As such, the instruction can leave before earlier (e.g., older) instructions in a program being executed. The instruction window refers to a set of instructions that can execute out-of-order.

An issue circuitry 206 can determine a respective cycle in which each of the instructions in the issue queue are to be issued. Issuing an instruction makes the instruction available to progress through circuitry of instruction execution (IE) stages, such as a first execution stage 208A, a second execution stage 208B, and a third execution stage 208C, of the pipeline 104. For simplicity of explanation, only three execution stages are illustrated in FIG. 2. However, the disclosure herein is not so limited: more or fewer execution stages are possible.

The pipeline 104 can include one more commit stages, such as a commit stage 210. A commit stage commits (e.g., writes to memory) results of instructions that have made their way through the IE stages 208A, 208B, and 208C. For example, a commit stage circuitry 217 may write back a result into a register file, such as the register file 106 of FIG. 1. However, some instructions may not be committed by the commit stage circuitry 217. Instead, the results of the instructions may be committed by other circuitry, such as circuitry in another stage of the back-end or a stage of the front-end, possibly based on information from the commit stage.

Between adjacent stages of the pipeline 104, the various paths through the pipeline circuitry include pipeline registers. For example, shown in FIG. 2 are pipeline registers 211 for the IE stages 208A, 208B, and 208C. The pipeline registers can be used for storing results of an upstream stage to be passed downstream to a next stage. The pipeline registers 211 may be clocked by (i.e., receive a clock signal derived from) a common clock (not shown). Thus, each clock cycle, each pipeline register 211 (also called a latch, or a set of flip-flops) can pass a result from its input to its output and becomes ready to receive a new result in its input after that result has been produced by the circuitry of that stage.

There may be multiple separate paths through the IE stages. The IE stages can include various circuitry for executing different types of instructions. For illustration purposes, only two paths 212A and 212B are shown in FIG. 2. However, the execution stages can include any number of paths with corresponding circuitry, which can be separated by pipeline registers, such as the pipeline registers 211.

The number of paths through the instruction execution stages can generally be dependent on the specific architecture. In an example, enough paths can be included such that a number of instructions up to a maximum number of instructions that can progress through the same execution stages in the same cycles. The maximum number of instructions that can progress through the same execution stages in the same cycles can be referred to as the issue width.

The number of stages that include functional circuitry for a given path may also differ. In the example of FIG. 2, a first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A and the second execution stage 208B, respectively. In the second path 212B, the third execution stage 208C is a "silo stage" that passes a result along without performing further computation thereby ensuring that each path passes through the same number of stages through the pipeline.

In an example, a path can include circuitry for executing instructions using units for various operations (e.g., ALU, multiplier, floating point unit, etc.). In an example, another path can include circuitry for executing memory access instructions. The memory access instructions can include load instructions that read data values from the memory system. The memory access instructions can include store instructions to write data values to the memory system. The circuitry for executing memory access instructions can also initiate translation of virtual addresses to physical addresses, when necessary, as described in more detail below with respect to FIG. 3.

In addition to branch prediction, as described with respect to the branch prediction circuitry 201, the pipeline 104 can be configured to perform other types of speculative execution. In an example of another type of speculative execution, the pipeline 104 can be configured to reduce the chance of stalling (such as in the event of a cache miss) by prefetching. Stalling refers to the situation in which processor execution of instructions is stopped/paused.

A prefetch request can be used to preload a cache level (e.g., of a data cache) so that a future memory request is likely to hit in that cache level instead of having to access a higher cache level or a main memory. For example, a speculative memory access request can include prefetch requests that are sent to preload an instruction cache or data cache based on a predicted access pattern.

A prefetch request can be or can include a software prefetch request such that an explicit prefetch instruction that is inserted into the pipeline 104 includes a particular address to be prefetched. A prefetch request can be or can include a hardware prefetch that is performed by hardware within the processor (e.g., the processor core 102) without an explicit prefetch instruction being inserted into its pipeline (e.g., the pipeline 104).

In some cases, prefetching can include recognizing a pattern (e.g., a set of correlated addresses) within the memory accesses of a program, or can include speculatively performing a load instruction within a program (e.g., using a speculative address, or an address to prefetch, for that load instruction) before that load instruction is actually issued as part of program execution.

Various types of external instructions can be received from other processor cores. Such externally received instructions can be inserted into the pipeline 104 by the issue circuitry 206 to be handled at the appropriate stage. An example of such an externally received instruction is a TLB invalidation (TLBI) instruction 220 for invalidating entries in the TLB of that particular processor core (i.e., the receiving core). Another example of an external instruction that can be received is a GlobalSync instruction, which may be broadcast to processor cores as a side effect of a memory barrier operation performed by a processor core to ensure that the effects of any previously broadcast TLBIs have been completed.

FIG. 3 is an example of a configuration of the processor memory system 108 of FIG. 1. In example illustrated in FIG. 3, the processor memory system 108 includes a memory management unit (MMU) 300 that manages access to the memory system. The MMU 300 can manage the translation of virtual addresses to physical addresses.

In some implementations, the MMU 300 can determine whether a copy of a stored value (e.g., data or an instruction) at a given virtual address is present in any of the levels of the hierarchical cache system, such as in any of the levels from an L1 cache 301 up to the LLC 120 (FIG. 1) if necessary. If so, then the instruction accessing that virtual address can be executed using a cached copy of the value associated with that address. If not, then that instruction can be handled by miss circuitry to be executed after accessing the value from a main memory 302.

The main memory 302, and potentially one or more levels of the cache system, may need to be accessed using a physical address (PA) translated from the virtual address (VA). To this end, the processor memory system 108 can include a TLB 304 that stores translations, defined by VA-to-PA mappings, and a page table walker 306 for accessing a page table 308 if a translation is not found in the TLB 304. The translations stored in the TLB can include recently accessed translations, likely to be accessed translations, some other types of translations, or a combination thereof.

The page table 308 can store entries, including a page table entry (PTE) 310, that contain all of the VA-to-PA mappings currently in use. The page table 308 can typically be stored in the main memory 302 along with physical memory pages that represent corresponding mapped virtual memory pages that have been "paged in" from secondary storage (e.g., the storage device 118A of FIG. 1). Such a miss in a page table that causes a page fault is another example of an interrupt that may be caused during program execution.

A memory page can include a number of cache blocks. A cache block can include a number of words. A word is of a predetermined number (e.g., 2) of bytes. A byte is a group of bits (e.g., 8 bits), which can be operated on as a unit. A byte can be considered a unit of memory size.

Alternatively, in a virtualized system with one or more guest operating systems managed by a hypervisor, virtual addresses (VAs) may be translated to intermediate physical addresses (IPAs), which are then translated to physical addresses (PAs). In a virtualized system, the translation by a guest operating system of VAs to IPAs may be handled entirely in software, or the guest operating system may have some hardware assistance from the MMU 300.

The TLB 304 can be used for caching recently accessed PTEs from the page table 308. The caching of recently accessed PTEs can enable the translation to be performed (such as in response to a load or a store instruction) without the page table walker 306 having to perform a potentially multi-level page table walk of a multiple-level data structure storing the page table 308 to retrieve the PTE 310. In an example, the PTE 310 of the page table 308 can store a virtual page number 312 and a physical page number 314, which together serve as a mapping between a VA and a PA that defines a translation of that VA.

An address (i.e., a memory address) can be a collection of bits. The bits of the memory address can be divided into low-order bits and high-order bits. For example, assuming 32-bit addresses, an example of a memory address is 01101001 00101000 00001101 01011100. The low-order bits are the rightmost 16 bits (i.e., 00001101 01011100); and the high-order bit are the leftmost 16 bits (i.e., 01101001 00101000). The low-order bits of a memory address can be used as a page offset. The low-order bits can be identical for a VA and its mapped PA. Thus, the high-order bits of a memory address can be used as a memory page number to specify the mapping.

The PTE 310 can also include status information (SI) 316. The SI 316 can indicate whether or not the page is resident in the main memory 302 or whether the page should be retrieved from secondary storage. When the PTE 310 is stored in an entry of any of the TLB 304, there may also be additional information for managing the transfer of PTEs between the page table 308 and the TLB 304, and for invalidating PTEs in the TLB 304. In an example, invalidating PTEs in the TLB 304 can be accomplished by toggling a bit (that indicates whether the entry is valid or not) to a state (i.e., a binary state) that indicates that the entry is invalid. However, other ways of invalidating PTEs are possible.

If a valid entry in the TLB 304 that matches with a portion of a VA to be translated is found (i.e., a "TLB hit"), then the PTE stored in that entry is used for translation. If there is no match (i.e., a "TLB miss"), then the page table walker 306 can traverse (or "walk") the levels of the page table 308 retrieve a PTE.

The L1 cache 301 can be implemented in any number of possible ways. In the implementation illustrated in FIG. 3, the L1 cache 301 is illustrated as being implemented as an N-way set associative cache module. Each cache entry 320 of the L1 cache 301 can include bits for storing a particular cache block 324 that has been copied from a physical page in the main memory 302 (possibly via higher level cache module).

The cache entry 320 can also include bits for storing a tag 322. The tag 322 can be made up of a number of the most significant bits of a virtual address, which are common to the words of that entry. For a virtually indexed, virtually tagged (VIVT) type of cache module, in addition to comparing a tag portion of a virtual address of desired data, the cache module can compare an index portion of the virtual address (which can be made up of middle bits between the tag and a block offset) to determine which of multiple sets may have a cache entry containing those desired data. The cache entry 320 can also include bits for storing status information 326. The status information 326 can include, for example, a valid bit, flags or error correction bits, other bits, or any combination thereof.

Figure 4:
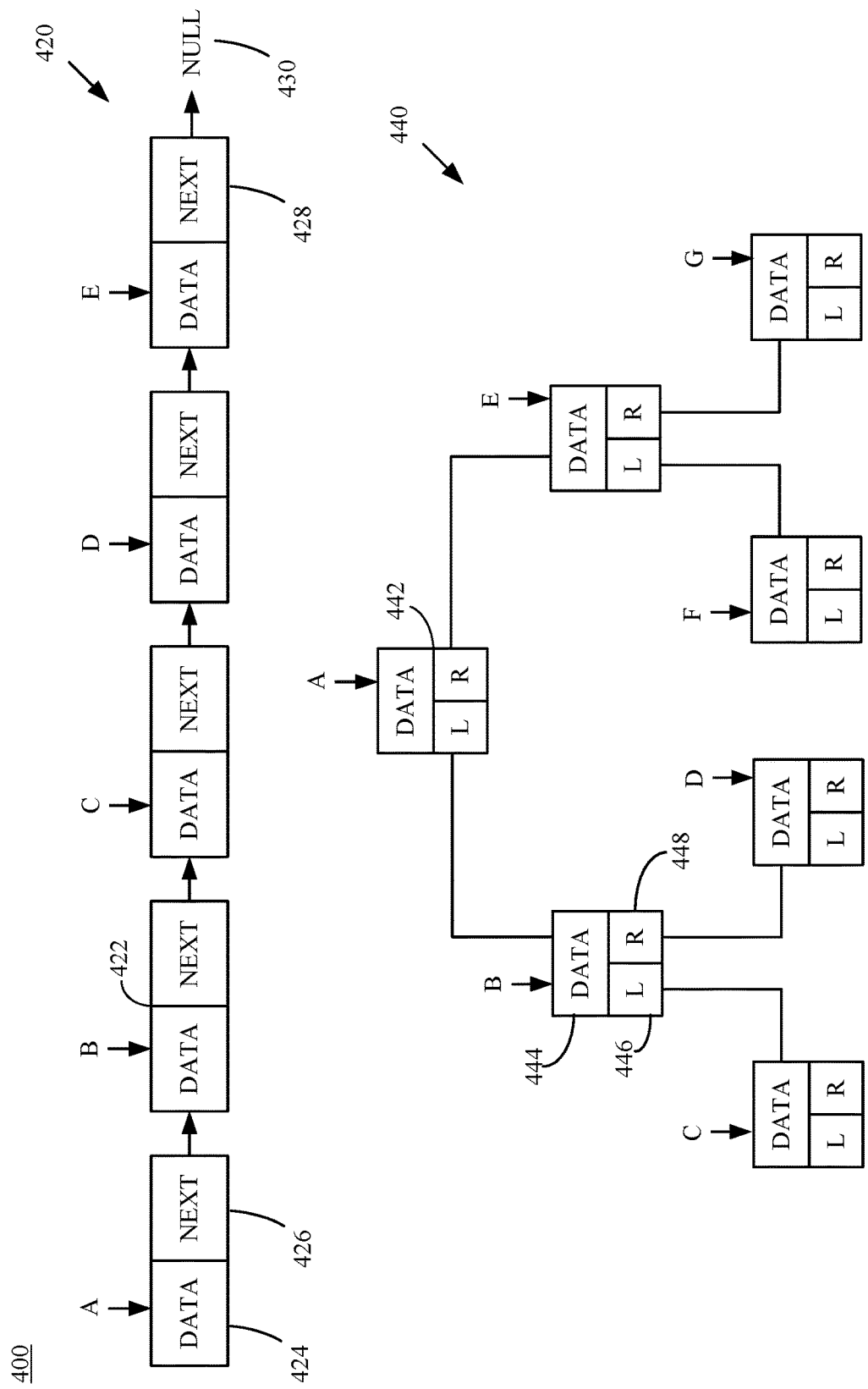
FIG. 4 illustrate examples of complex data structures.

FIG. 4 illustrate examples 400 of complex data structures. The examples 400 includes a linked list 420 and a tree 440. However, the disclosure herein in not limited to complex data structures that are linked lists and/or trees. For example, the complex data structure can be an object structure that includes (e.g., points to, etc.) other fields or structures, and so on. The examples 400 are used to illustrate correlated prefetching.

The linked list 420 includes nodes, such as a node 422. Each node includes one or more data fields, such as data 424, and a pointer to a next node in the linked list 420, such as a pointer 426. Each node is stored at a memory location. For example, the node 422 is at memory address B. A pointer 428 of a last node in the linked list 420 is NULL, as illustrated by a null 430. The linked list 420 includes five nodes, which are at respective addresses A, B, C, D, and E. However, a linked list can include any number of nodes.

Listing 1 illustrates a program that traverses the link list. At row 1, a variable "currentNode" is initialized to the address of the first node in the linked list. Thus, the variable currentNode is set to the address A. Rows 2 and 5 illustrate that the rows 3 and 4 are performed for each node of the linked list. At row 3, some useful instructions may be performed with respect to one or more of the data fields of the current node (i.e., currentNode.data) of the current node. At row 4, the variable currentNode is updated to point to the next node in the linked list. Thus, the program instructions in rows 1 and 4 result in the following pattern of addresses of the linked list 420 being accessed: A, B, C, D, and E. For simplicity of explanation, any memory address accesses of the row 3 are ignored.

| Listing 1 | |
|---|---|
| 1 | currentNode = A; |
| 2 | while node != null |
| 3 | <do something with currentNode.data> |
| 4 | currentNode = currentNode.next; |
| 5 | end while |

If the instructions of Listing 1 are executed several times, then a correlated prefetcher can learn that an access of A is typically followed by an access to B, which is then followed by an access to C, and so on. Thus, upon detecting an access to A, the prefetcher can prefetch the content of address B, and so on. The prefetcher can be set up to prefetch one or more addresses when a pattern of addresses that include two or more addresses is detected (e.g., identified, etc.). For example, the prefetcher can be configured to prefetch C when the pattern of addresses (A, B) is identified; to prefetch D when the pattern of addresses (B, C) is identified; and so on.

The tree 440 may be a binary tree. Each node, such as a node 442, includes one or more data fields, such as data 444, a left pointer to a left child node, such as a left pointer 446, and a right pointer to a right child node, such as a right pointer 448. Each node is stored in a memory location. For example, the node 442 is at the memory address A. If a node does not have a left (right) child, then the left (right) pointer of the node is NULL, as described with respect to the pointer 428.

Listing 2 illustrates a program listing that traverses the tree 440. The Listing 2 includes a first set of instructions (i.e., row 2) that causes the tree 440 to be traversed in preorder depth-first order. Thus, the row 2 causes the tree 440 to be visited in the order A, B, C, D, E, F, and G. The listing 2 also includes a second set of instructions (i.e., row 4) that causes the tree 440 to be traversed in breadth-first order. Thus, the row 4 causes the tree 440 to be visited in the order A, B, E, C, D, F, and G.

Listing 2

```
1       ...
2               traverseTreeInPreOrder ( A );
3       ...
4               traverseTreeInBreadthFirst( A );
6       ...
```

With respect to the preorder traversal, the access patterns include (A, B, C) and (C, D, E). On the other hand, with respect to the breadth-first traversal, the access patterns include (A, B, E) and (C, D, F). Thus, with respect to preorder traversal, in response to detecting the pattern of addresses (A, B), a correlated prefetcher can prefetch C; and, in response to detecting the pattern of addresses (C, D), the correlated prefetcher can prefetch E. On the other hand, with respect to breadth-first traversal, in response to detecting the pattern of addresses (A, B), a correlated prefetcher can prefetch E; and, in response to detecting the pattern of addresses (C, D), the correlated prefetcher can prefetch F.

To distinguish which pattern is applicable for the purpose of prefetching, the prefetcher can use an indication of which part of the program is being executed. In an example, the prefetcher can use the program counter as an indication of the part of the program that is being executed.

Figure 5:
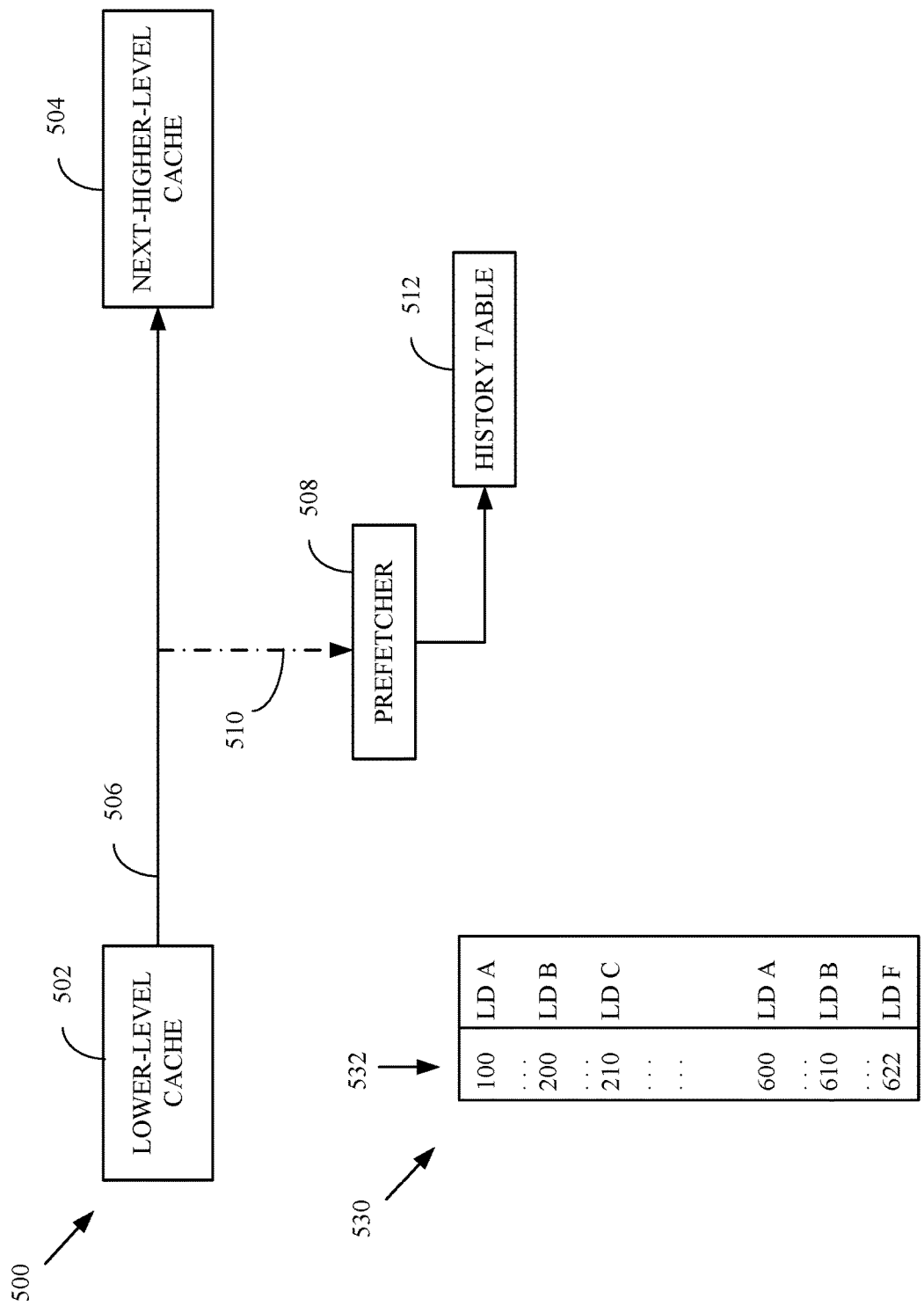
FIG. 5 is a diagram of an example of a prefetcher.

FIG. 5 is a diagram of an example 500 of a prefetcher. The example 500 includes a lower-level cache 502 and a next-higher-level cache 504. The lower-level cache 502 and a next-higher-level cache 504 are such that, in a case of a miss in the lower-level cache 502, the cache system attempts to access (i.e., read or write) the memory block from the next-higher-level cache 504. In an example, the lower-level cache 502 can be the L1 cache 301 of FIG. 3 and the next-higher-level cache 504 can be the L2 cache.

A prefetcher 508 monitors, as illustrated by an arrow 510, all memory requests (illustrated by an arrow 506) from the lower-level cache 502 to the next-higher-level cache 504. In a history table 512, the prefetcher maintains patterns of previously recorded (e.g., learned, being learned, etc.) miss-address sequences. In the history table 512, the prefetcher 508 captures relationships between miss addresses (i.e., pattern of addresses) and their likely successors. On each miss (e.g., a request from the lower-level cache 502 to the next-higher-level cache 504), the prefetcher 508 searches the history table 512 for a pattern of addresses corresponding to the miss. If a match is found, the prefetcher 508 prefetches the likely successor. The successor addresses can include more than one address. The pattern of addresses can include any number of addresses. Examples of history tables are described with respect to FIG. 7.

For example, and referring to the linked list 420 of FIG. 4, in response to detecting the pattern of addresses (A, B), the prefetcher 508 can prefetch the address C. In another example, and referring to the tree 440, in response to detecting the pattern of addresses (A, B) and the program counter being indicative of the preorder traversal of the Listing 2, the prefetcher 508 prefetches the successor address C. On the other hand, in response to detecting the pattern of addresses (A, B) and the program counter being indicative of the breadth-first traversal of the Listing 2, the prefetcher 508 prefetches the successor address E.

That the program counter is indicative of the preorder (or breadth-first) traversal can mean, broadly, program counter (s) associated with at least one of the load instructions of the addresses of the pattern of addresses. For example, instructions 530 illustrate program instructions that are executable by a core of the at least one processor core 102 of FIG. 1. A program counter 532 is associated with each of the illustrated instructions.

For example, a PC of 100 is associated with the "LD A" (i.e., load the contents of address A) instruction. The instructions with PC values 100, 200, and 210 can be the instructions associated with (e.g., related to, corresponding to, etc.) the row 2 of Listing 2; and the instructions with PC values 600, 610, and 622 can be the instructions associated with (e.g., related to, corresponding to, etc.) the row 4 of Listing 2.

Thus, in response to detecting the pattern of addresses (A, B), the prefetcher 508 can use at least one of the PC values associated a load instruction of A and B to determine whether C or F should be prefetched. If the PC is at least one of the 100 or 200, then the prefetcher 508 prefetches C. If, on the other hand, the PC is at least one of 600 or 610, then the prefetcher 508 prefetches F.

Figure 6:
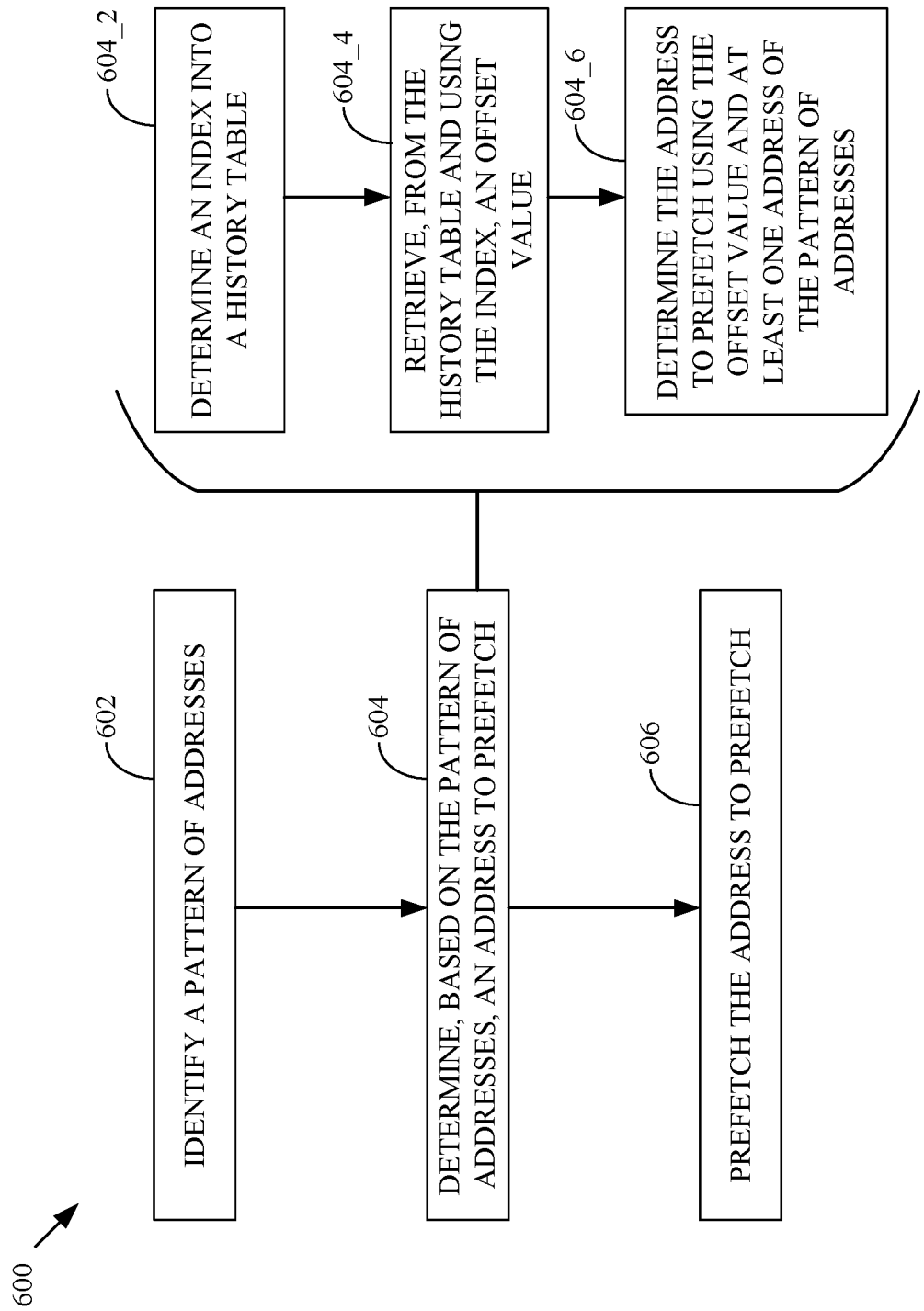
FIG. 6 is a flowchart of a technique for memory prefetching in a processor.

FIG. 6 is a flowchart of a technique 600 for memory prefetching in a processor. The technique 600 can be implemented by a prefetcher, such as the prefetcher 508 of FIG. 5. The technique 600 can be used to monitor memory accesses and prefetch from other memory addresses based on the memory accesses. The technique 600 learns that a pattern of addresses (e.g., correlated pattern of addresses) is typically accessed in a particular sequence. The monitored memory level can be any memory level of the hierarchical memory system. In an example, the monitored memory level can be the L1 cache 301 of FIG. 3.

When accesses to a sub-pattern of the pattern of addresses is detected (e.g., identified, recognized, etc.), the technique 500 prefetches at least one address that is a lookahead value away from the sub-pattern. The lookahead signifies the number of accesses prior to the prefetched address required to initiate the prefetch. For example, in the learned sequence of addresses A, B, C, D, E, F, and G, when the pattern of addresses (A, B) is detected, given a lookahead value or 1, C is prefetched; and given a lookahead value of 3, E is prefetched. In an example, the lookahead value can be a state variable that is maintained by the prefetcher, such as the prefetcher 508 of FIG. 5.

At 602, the technique 600 identifies, in response to memory access instructions, a pattern of addresses. As used in this disclosure, "identify" means to form, produce, select, construct, determine, specify, generate, or other identify in any manner whatsoever. At 604, the technique 600 determines, based on the pattern of addresses, an address to prefetch. At 606, the technique 600 prefetches the address to prefetch.

The technique 600 can identify the address to prefetch in a history table, such as the history table 512 of FIG. 5. The technique 600 is described with reference to FIG. 7.

Figure 7:
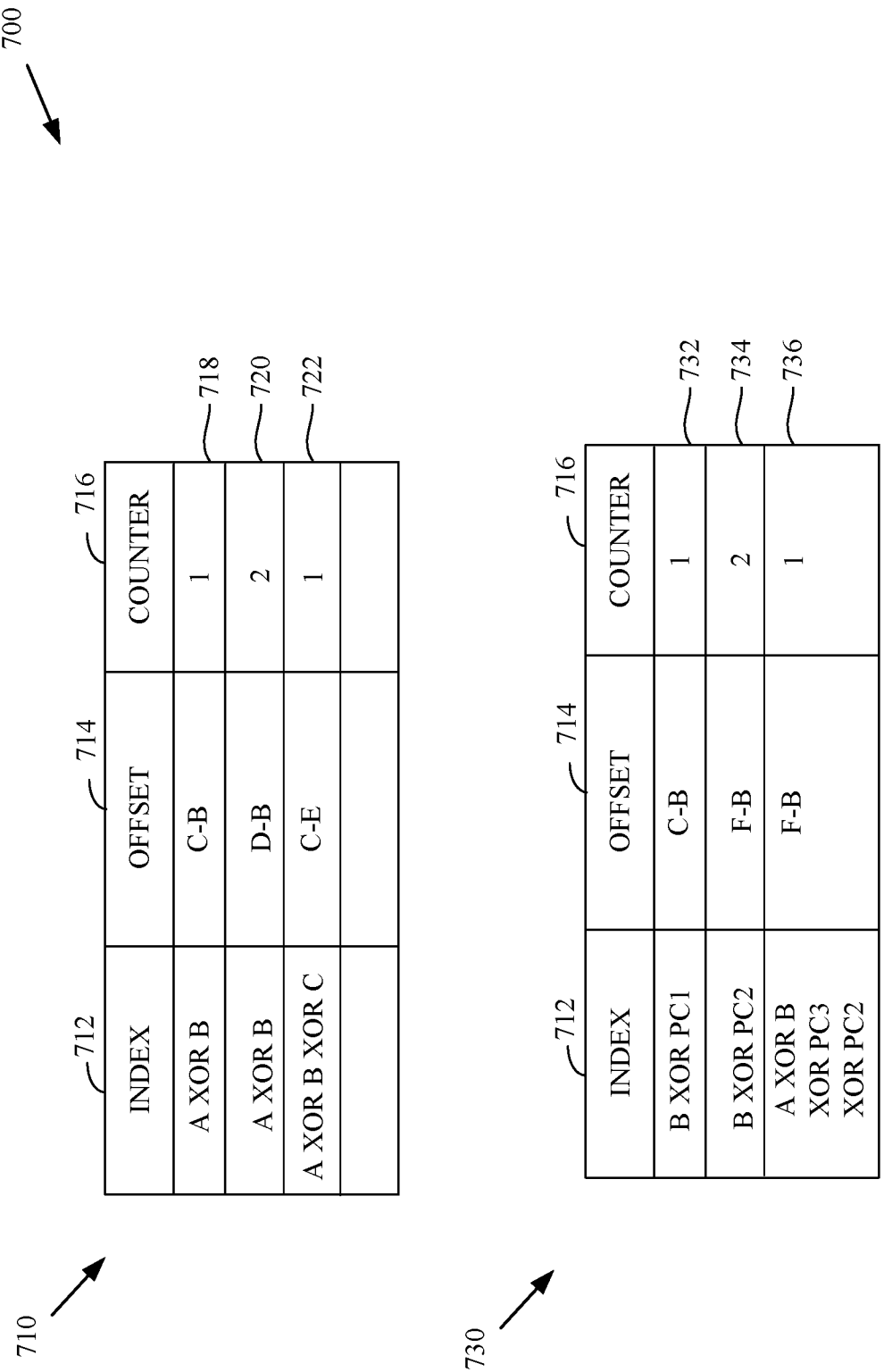
FIG. 7 illustrates examples 700 of history tables.

FIG. 7 illustrates examples 700 of history tables. The examples 700 includes a history table 710 and a history table 730. The history table 710 is used to illustrate entries related to the learned sequence of addresses (A, B, C, D, E), which may correspond to the accessing of the linked list 420 of FIG. 4. The history table 730 is used to illustrate entries related to the learned sequences (A, B, C) and (A, B, E) corresponding respectively to, as described above, the preorder and breadth-first traversals of the tree 440 of FIG. 4 and the Listing 2. That, as illustrations, the history table 710 is used in conjunction with the linked list 420 or that the history table 730 is used in conjunction with the tree 440 is not meant to impose any limitation whatsoever on either of the history table 710 or the history table 730 or imply any unique use with particular data structures.

Each of the history tables 710, 730 includes an index 712, an offset 714, and a counter 716 columns. In an implementation, the history table may not include an index column. Rather an index value can be calculated and used as a pointer into a row of the history table. In an implementation, the history table may not include the counter 716.

Determining, based on the pattern of addresses, the address to prefetch, at 604, includes determining, at 604_2, using the pattern of addresses, an index into a history table; retrieving, at 604_4, from the history table and using the index, an offset value that is not the address to prefetch; and determining, at 604_6, the address to prefetch using the offset value and at least one address of the pattern of addresses.

At 604_2, the index into the history table can be calculated using a function such that the result of the function uses a number of bits that is smaller than the number of bits required to store an absolute address. In an example, the function can be implemented using circuitry (e.g., one or more logic gates). For example, leveraging the fact that programs tend to access spatially related memory addresses, the function can be the exclusive-or (XOR) function. The XOR function outputs the true value only when its inputs differ. The index can be calculated by XORing at least some of the addresses of the pattern of addresses.

An entry 718 of the history table 710 of FIG. 7 illustrates that given the pattern of addresses (A, B), the index 712 can be calculated as (A XOR B). Each of addresses A and B can be a 64 bit, 48 bit, or some other number of bits. However, if A and B are spatially related (e.g., proximal, etc.), then the index (A XOR B) can be significantly smaller, in terms of bits. For example, if A=0xFFEF and B=0xFFDF, which are 16-bit addresses, the index value (A XOR B) is 0x30, which is a 6-bit value. Thus, less space can be used for indexing in the history table. It is noted that such reduction in bits (e.g., using the XOR function) may result in collisions, which may lead to a prefetched address that is not currently useful.

An entry 722 illustrates a detected pattern of addresses (A, B, C). The index is calculated by XORing all the addresses of the pattern of addresses. However, in some implementations, less than all of the addresses of the pattern of addresses can be XORed. For example, only the last two addresses of the pattern of addresses can be XORed. For example, only the first two addresses of the pattern of addresses can be XORed. Other combinations of addresses of the pattern of addresses can be XORed.

In some implementations, and as mentioned, determining, at 604_2, using the pattern of addresses, the index into the history table can include determining the index by XORing the addresses of the pattern of addresses and at least one program counter associated with an address of the pattern of addresses. As such, what to prefetch and the pattern of addresses can be localized to the part of the program that is accessing the memory.

An entry 732 of the history table 730, corresponding to the sequence of addresses (A, B, C) or merely the sequence (B, C) of the preorder traversal case, illustrates that the address B is XORed with the program counter (PC1) of a load instruction of the address B. For example, PC1 can be the value 200 shown in the instructions 530 of FIG. 5. An entry 734 of the history table 730, corresponding to the sequence of addresses (A, B, F) or merely the sequence (B, F) of the breadth-first traversal case, illustrates that the address B is XORed with the program counter (PC2) of a load instruction of the address B. For example, PC2 can be the PC value 610 shown in the instructions 530 of FIG. 5.

Other ways of using the program counter(s) are possible. For example, all addresses of the pattern of addresses (e.g., (A, B)) and a program counter associated with a first address of the pattern of addresses (e.g., PC3=600 of FIG. 5), a program counter associated with a last address of the pattern of addresses (e.g., PC2=610 of FIG. 5), or a combination thereof can be used. Thus, the index can be calculated as (A XOR B XOR PC3) or (A XOR B XOR PC2) or (A XOR B XOR PC2 XOR PC3), which is shown in an entry 736.

In an example, the history table can be a content-addressable memory (CAM). In the CAM, the pattern of addresses (e.g., (A, B)) can provide the index. An XOR of the program counters of the addresses of the pattern of addresses can provide a tag index into the CAM entries. Thus, for the same values of the addresses of the pattern of addresses (e.g., (A, B)) can be used to predict (e.g., provide, etc.) different addresses to prefetch based on the program counters.

At 604_4, the technique 600 retrieves, from the history table and using the index, an offset value that is not the address to prefetch itself. In an example, the offset value can be a difference between one address of the pattern of addresses and the address to prefetch. In an example, the one address of the pattern of addresses is a last address of the pattern of addresses.

The entry 718 illustrates that the offset (B-C) is saved to the offset 714. That is, during a learning phase, the prefetcher may have detected that accessing A followed by an accessed to B is typically followed by an access to C. Thus, the prefetcher created the entry for the pattern (A, B, C) where the index is (A XOR B) and, instead of storing the prefetch address C itself, stores an offset value (C-B). Whereas, for example, each of the addresses C and B may be, for example, a 64-bit address, the offset (C-B) requires relatively few bits, since B and C are likely to be spatially related (e.g., proximal) addresses. While in the entries 718, 720, 722, 732, 734, and 736 the last address of the pattern of addresses is used by the prefetcher to calculate and store the offset during the learning phase, other addresses of the pattern of addresses can be used, as already mentioned above.

At 604_6, the technique 600 determines the address to prefetch using the offset value and at least one address of the pattern of addresses. That is, for example, the technique 600 adds the offset to whichever address of the pattern of addresses was used to calculate and store the offset in the first place. Thus, for example, in the case of the entry 718, the technique 600 calculated the address to prefetch using ((C-B)+B).

In an example, the technique 600 can include, in response to identifying the pattern of addresses, incrementing a counter associated with the pattern of addresses. The counter can be the counter 716 of FIG. 7. That is, each time that a pattern of addresses is noticed by the technique 600, the counter of the associated entry in the history table is incremented. For example, a first time that a pattern of addresses is identified, a new entry is added to the history table and the associated counter is initialized to, for example, 0. However, the counter may be initialized to another value, such as 1. Thus, as the entry 718 of the history table 710 shows, the pattern of addresses (A, B) followed by an access to C has been identified twice: the first time it was identified, the entry 718 was created and the counter 716 initialized to 0; and the second time it was identified, the counter was incremented by 1.

The counter can be a saturating counter. In an example, the counter can be n-bits wide, where n can be one, two, three, or more number of bits. Thus, the counter saturates when the counter is equal to $2^n$. In an example, the technique 600 does not prefetch the address to prefetch until the counter saturates or reaches some predetermined threshold value. That is, the technique 600 keeps incrementing the counter associated with, for example, the pattern (A, B, C) (i.e., corresponding to the entry 718) until the counter 716 saturates. After the counter saturates, then every time the technique 600 detects the pattern of addresses (A, B), the technique 600 prefetches the address C. When the counter associated with a pattern saturates, the technique 600 (e.g., the prefetcher 508) can be considered to be fully trained (e.g., has learned, etc.) the pattern. Thus, in an example, the technique 600 can include, only on a condition that the counter has reached a threshold value (e.g., the counter saturates), performing 1) the determining the address to prefetch and 2) the prefetching the address to prefetch.

As mentioned above, while memory addresses may be M-bits wide (where M may be 48, 64, fewer, or more bits), the offset 714 is shorter than M bits. The offset 714 can hold offsets that are L-bits wide, where L<M. L can be 8, 10, fewer, or more bits. If the difference (e.g., C-B) between the address to prefetch (e.g., C) and the one address of the pattern of addresses (e.g., B), then an entry is not saved for the pattern in the history table. Thus, in an example, the technique 600 can include, in response to detecting the memory access instructions of the pattern of addresses followed by an access to the address to prefetch, the technique 600 calculates the offset value; and, in response to the offset value meeting a storage criterion, inserting an entry in the history table, wherein the entry comprising the index and the offset value. The storage criterion can be a predetermined number of bits.

In some implementations, the prefetching lookahead may be increased (or decreased).

One of the key aspects of a prefetch operation (or simply "a prefetch") is the timing of the prefetch. If the prefetch is too early, the prefetched data may get replaced from the data cache by another prefetch or a demand-fetch. If the prefetch is too late, then the load operation that needs the prefetched data may need to stall if the prefetched data has not yet been cached.

Adjusting the prefetch to be issued at the correct time can increase performance. Adjusting the prefetch can include dynamically selecting an appropriate address to fetch in response to detecting a memory access. That is, rather than setting a constant lookahead value for a prefetcher, the lookahead value can be changed depending on conditions of the computing system.

How long it takes a prefetch to return with data depends on which level of the cache hierarchy the prefetch hits on. This can also dynamically change for at least the following two reasons. First, hyperthreaded processor cores may have multiple hardware threads sharing the same L1 cache and displacing each other's data. Second, in multicore processors, the shared last level cache (LLC) can incur greater misses because multiple cores share the LLC. Thus, the data that might hit in the same last-level cache for a single core may miss in the last-level cache with multiple cores.

Accordingly, prefetches can be based on a measure of the memory access latency (e.g., a latency between a memory access request and a response to that memory access request). For example, the lookahead value can vary depending on the memory access latency. The memory access latency can refer to the number of processor cycles from a time that a memory access instruction (e.g., a load instruction) is issued until the time that data is received. The memory access latency can be measured by a core or provided by another part of the system; and the measurement can be based on a direct measurement that uses a timer, or an indirect measurement that uses an estimate or a heuristic to measure the memory access latency.

To illustrate an example, if the memory access latency increases, the prefetcher can automatically increase the lookahead. For example, if the lookahead is 1 for a prefetcher that learns the pattern (A, B, C, D, E, F, G), then on seeing (A, B), the prefetcher launches a prefetch for C, such as illustrated in the entry 718 of the history table 710. To increase the lookahead value as the memory access latency increases, the prefetcher can set the lookahead value to 2 and prefetch D when an access to pattern of addresses (A, B) is detected, such as illustrated in the entry 720 of the history table 710. The entry 720 illustrates that the index (A XOR B) is used to prefetch the address D.

Figure 8:
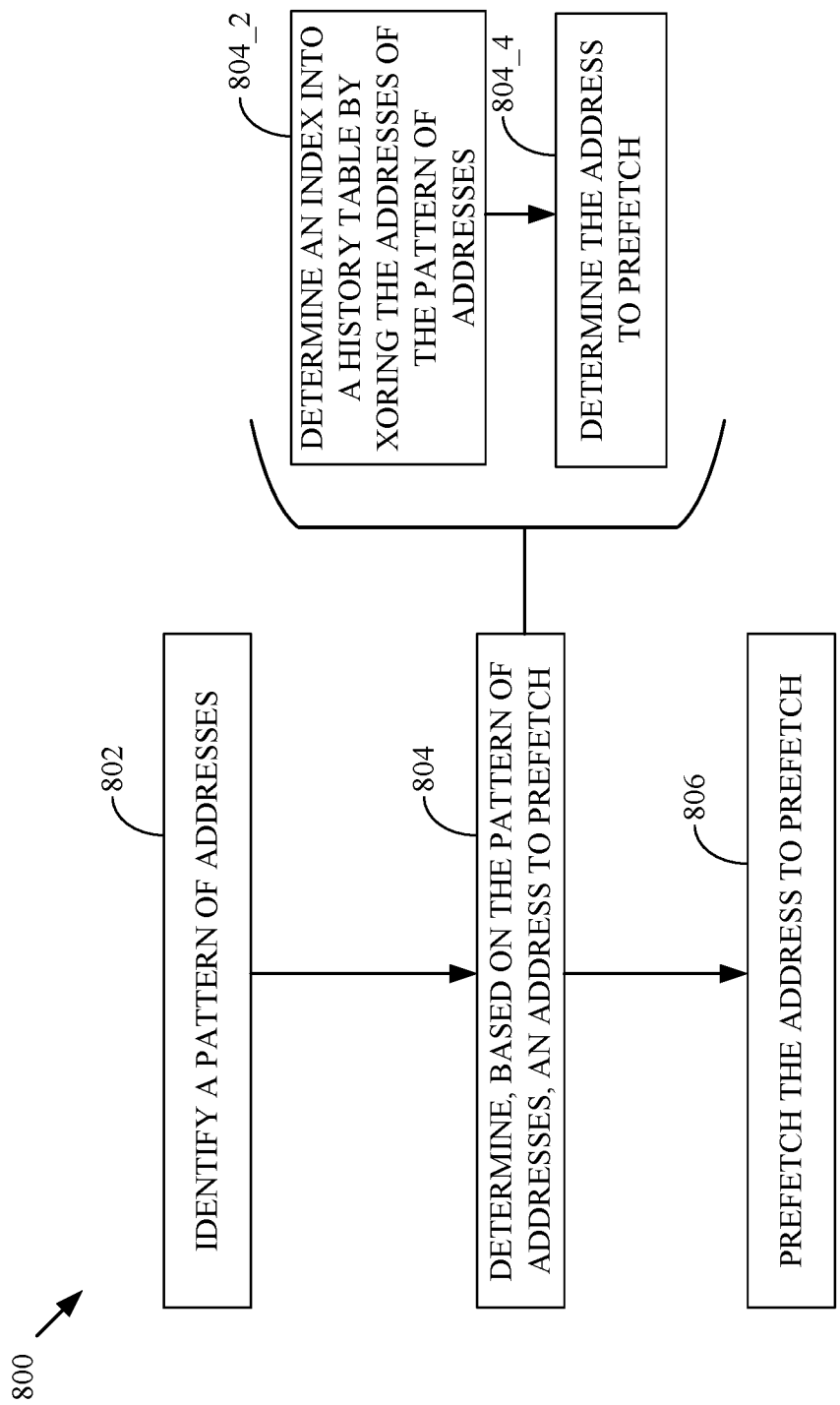
FIG. 8 is a flowchart of a technique for memory prefetching in a processor.

FIG. 8 is a flowchart of a technique 800 for memory prefetching in a processor. The technique 800 can be implemented by a prefetcher, such as the prefetcher 508 of FIG. 5. The technique 800 can be used to monitor memory accesses and prefetch from other memory addresses based on the memory accesses. The technique 800 learns that a pattern of addresses (e.g., correlated pattern of addresses) is typically accessed in a particular sequence. The monitored memory level can be any memory level of the hierarchical memory system. In an example, the monitored memory level can be the L1 cache 301 of FIG. 3.

At 802, the technique 800 identifies, in response to memory access instructions, a pattern of addresses. Identifying the pattern of addresses can be as described with respect to 602 of FIG. 6. At 804, the technique 800 determines, based on the pattern of addresses, an address to prefetch. At 806, the technique 800 prefetches the address to prefetch. Prefetching the address to prefetch can be as described with respect to 608 of FIG. 6.

Determining, based on the pattern of addresses, the address to prefetch, at 804, includes, at 804_2, determining, using the pattern of addresses, an index into a history table, by XORing the addresses of the pattern of addresses, as described above with respect to, for example, the entries 718, 720, and 722; and, at 604_4, determining, by accessing the history table using the index, the address to prefetch.

In an example, given the learned pattern "C is accessed after the pattern of addresses (A, B)," the prefetcher can use (A XOR B) as an index into a history table (not shown) and retrieve the address C itself from a column of the history table where the column includes the address itself (e.g., C) to prefetch.

In an example, determining, by accessing the history table using the index, the address to prefetch can include obtaining an offset value from the history table where the offset value is not the address to prefetch; and determining the address to prefetch using the offset value and at least one address of the pattern of addresses. Obtaining the offset value and the address to prefetch can be as described with respect to FIG. 6. In an example, the offset value is a difference between one address of the pattern of addresses and the address to prefetch. In an example, the one address of the pattern of addresses is a last address of the pattern of addresses.

In an example, the technique 800 can further include, as described above with respect to the technique 600, in response to detecting the memory access instructions of the pattern of addresses followed by an access to the address to prefetch, calculating the offset value; and in response to the offset value meeting a storage criterion, inserting an entry in the history table, wherein the entry comprising the index and the offset value.

In an example, determining the index into the history table, by XORing the addresses of the pattern of addresses can further include determining, using the pattern of addresses, the index into the history table by further XORing a program counter associated with at least one address of the pattern of addresses. That is, program counters of one or more of the addresses of the pattern of addresses can be used as described above.

In some situations, a correlated prefetcher table (i.e., a history table) associated with a lower-level cache 502 of FIG. 2 (e.g., the L1 cache) may be too small (e.g., 256 KB) to be able to hold all the prefetch state. The prefetch state can be defined as the set of all learned patterns of addresses. In such situations, a next-higher-level cache 504 (e.g., the L2 cache) history table may be used.

When an entry in the lower-level cache (e.g., L1) history table is overwritten, it can be first replaced into the next-higher-level cache (e.g., L2) history table. When a prefetch is triggered and an entry is not found in the lower-level cache history table, the next-higher-level cache history table can be accessed to determine whether the next-higher-level cache history table contains the entry.

To accommodate the longer latencies of accessing the next-higher-level cache history table, the prefetch should be initiated early enough. In order to initiate a prefetch of a given address that is later in a long pattern of addresses, an entry in the history table storing that pattern may need to be longer. When the lower-level cache table misses, a block prefetch can be initiated as follows. Assume that the following entries are in the next-higher-level cache history table: the pattern of addresses (A, B) prefetches C; the pattern of addresses (B, C) prefetches D; and the pattern of addresses (C, D) prefetches E. All of these entries can be prefetched from the next-higher-level cache history table to the lower-level cache history table, thereby prefetching an entire correlated region.

For simplicity of explanation, the techniques 600 and 800 are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the prefetcher 508 of FIG. 5 (and the algorithms, methods, instructions, etc., stored thereon and/or executed thereby, including the techniques 600 and 800) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for memory prefetching in a processor, comprising:
identifying, in response to memory access instructions, a pattern of addresses;
determining, based on the pattern of addresses, an address to prefetch, wherein determining the address to prefetch comprises:
determining, using the pattern of addresses, an index into a history table;
retrieving, from the history table and using the index, an offset value, wherein the offset value is not the address to prefetch; and
determining the address to prefetch using the offset value and at least one address of the pattern of addresses; and
prefetching the address to prefetch.

2. The method of claim 1, wherein the offset value is a difference between one address of the pattern of addresses and the address to prefetch.

3. The method of claim 2, wherein the one address of the pattern of addresses is a last address of the pattern of addresses.

4. The method of claim 1, wherein determining, using the pattern of addresses, the index into the history table comprising:
determining the index by XORing the addresses of the pattern of addresses.

5. The method of claim 1, wherein determining, using the pattern of addresses, the index into the history table comprising:

determining the index by XORing the addresses of the pattern of addresses and at least one program counter associated with an address of the pattern of addresses.

6. The method of claim 1, further comprising:
in response to identifying the pattern of addresses, incrementing a counter associated with the pattern of addresses.

7. The method of claim 6, further comprising:
only on a condition that the counter has reached a threshold value, performing the determining the address to prefetch and the prefetching the address to prefetch.

8. The method of claim 1, further comprising:
in response to detecting the memory access instructions of the pattern of addresses followed by an access to the address to prefetch:
    calculating the offset value; and
    in response to the offset value meeting a storage criterion, inserting an entry in the history table, wherein the entry comprising the index and the offset value.

9. The method of claim 1,
wherein the index is a first index for a first set of instructions and a second index for a second set of instructions, and
wherein the offset value is a first offset value when the index is the first index and a second value when the index is the second index.

10. A method for memory prefetching in a processor, comprising:
identifying, in response to memory access instructions, a pattern of addresses;
determining, based on the pattern of addresses, an address to prefetch, wherein determining the address to prefetch comprises:
    determining, using the pattern of addresses, an index into a history table, by XORing the addresses of the pattern of addresses; and
    determining, by accessing the history table using the index, the address to prefetch; and
prefetching the address to prefetch.

11. The method of claim 10, wherein determining, by accessing the history table using the index, the address to prefetch comprising:
obtaining an offset value from the history table, wherein the offset value is not the address to prefetch; and
determining the address to prefetch using the offset value and at least one address of the pattern of addresses.

12. The method of claim 11, wherein the offset value is a difference between one address of the pattern of addresses and the address to prefetch.

13. The method of claim 12, wherein the one address of the pattern of addresses is a last address of the pattern of addresses.

14. The method of claim 11, further comprising:
in response to detecting the memory access instructions of the pattern of addresses followed by an access to the address to prefetch, calculating the offset value; and
in response to the offset value meeting a storage criterion, inserting an entry in the history table, wherein the entry comprising the index and the offset value.

15. The method of claim 10, wherein determining, using the pattern of addresses, the index into the history table, by XORing the addresses of the pattern of addresses comprising:
determining, using the pattern of addresses, the index into the history table by further XORing a program counter associated with at least one address of the pattern of addresses.

16. A computing system, comprising:
a lower-level cache;
a next-higher-level cache; and
a prefetcher, wherein the prefetcher is configured to:
    identify, in response to memory access instructions, a pattern of addresses;
    determine, based on the pattern of addresses, an address to prefetch, wherein to determine the address to prefetch comprises to:
        determine, using the pattern of addresses, an index into a history table;
        retrieve, from the history table and using the index, an offset value,
        wherein the offset value is not the address to prefetch; and
        determine the address to prefetch using the offset value and at least one address of the pattern of addresses; and
    prefetch the address to prefetch.

17. The computing system of claim 16, wherein the lower-level cache is an L1 cache and the next-higher-level cache is an L2 cache.

18. The computing system of claim 16, wherein the offset value is a difference between one address of the pattern of addresses and the address to prefetch.

19. The computing system of claim 16, wherein to determine, using the pattern of addresses, the index into the history table comprises to:
determine the index by XORing the addresses of the pattern of addresses.

20. The computing system of claim 16, wherein to determine, using the pattern of addresses, the index into the history table comprises to:
determine the index by XORing the addresses of the pattern of addresses and at least one program counter associated with an address of the pattern of addresses.

* * * * *